Nov. 17, 1959 R. H. WITT ET AL 2,912,814
CUTTER BAR DRIVE
Filed June 18, 1957 2 Sheets-Sheet 1
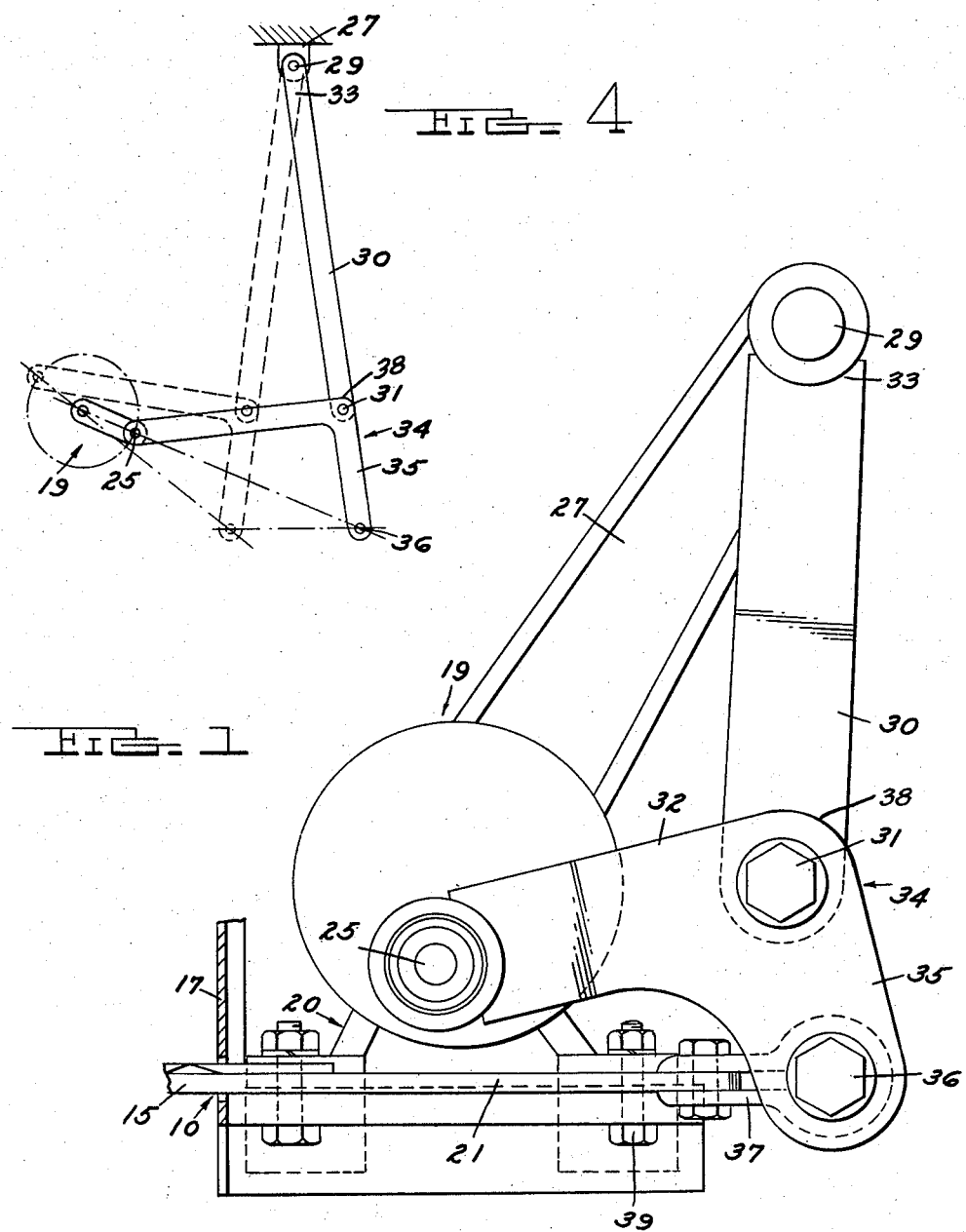
INVENTORS
R. H. WITT
D. S. LOCK
E. C. McRAE
J. R. FAULKNER
P. F. HILDER
BY ATTORNEYS

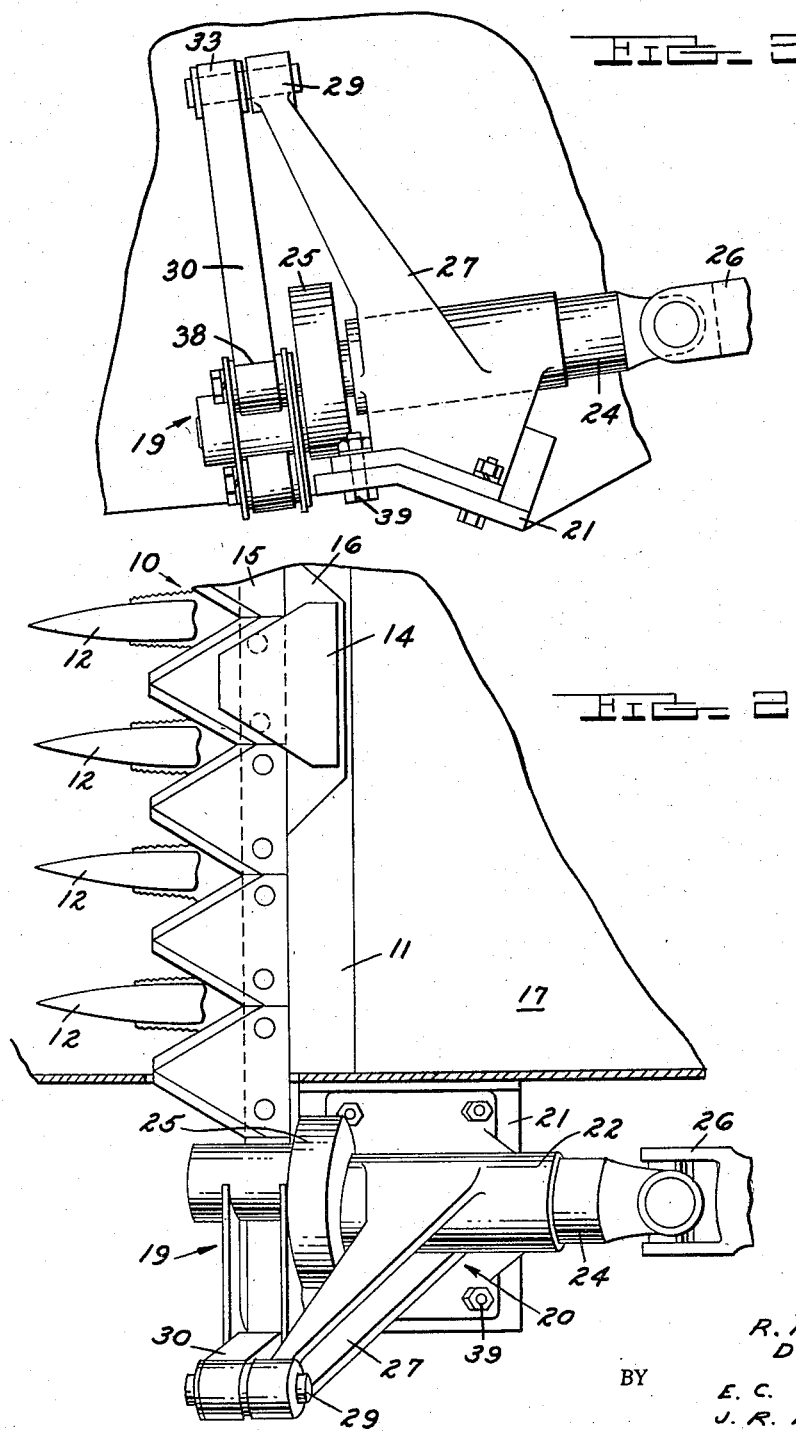

United States Patent Office 2,912,814
Patented Nov. 17, 1959

2,912,814

CUTTER BAR DRIVE

Robert H. Witt, Hinsdale, Ill., and Douglas S. Lock, Troy Township, Oakland County, Mich., assignors to Ford Motor Company, Dearborn, Mich., a corporation of Delaware Application June 18, 1957, Serial No. 666,415

2 Claims. (Cl. 56—296)

This invention relates to cutter bar assemblies, and more particularly to an improved cutter bar drive.

Cutter bar assemblies consist in general of an elongated cutter bar and a reciprocable knife, the assembly being mounted in a mower, forage harvester or other implement which is capable of being traversed across a field for cutting a crop. As the assembly is moved forwardly, the knife, which is mounted for reciprocable movement along the length of the cutter bar, is reciprocated to cause triangular shaped knife sections to shear the crop.

The present invention deals with an improved, simplified driving mechanism for converting rotary motion supplied from a power source into reciprocable motion for driving the knife. A feature of the present invention is that, by a simple mechanism, a substantially straight line reciprocal motion is obtained which acts in the direction of the length of the knife, introducing no substantial force acting on the knife other than lengthwise thereof, thus reducing vibration, increasing life of the mechanism and eliminating heavy guides at the knife head.

Among the objects of the present invention are to provide a simplified and dependable cutter bar drive having essentially a straight line motion; and to generally improve on such drives. Other objects and the nature and scope of the invention will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification in which:

Figure 1 is a front elevation of a portion of a cutter bar assembly, including the cutter bar drive of the present invention.

Figure 2 is a top plan view of the cutter bar assembly and drive of Figure 1, a portion of a frame for supporting the cutter bar being shown.

Figure 3 is a side elevation of the mechanism shown in Figure 2.

Figure 4 is a diagrammatic sketch of the linkage of the drive mechanism.

Referring now to Figures 1 and 2, the cutter bar assembly 10 of the present invention is more or less conventional, having a cutter bar 11 provided with a series of spaced guards 12 mounted on its leading edge. A series of knife hold-down clips, one clip 14 being shown, hold down a knife 15 for reciprocal motion longitudinally on the cutter bar. A wear plate 16 may be located under each clip 14 for supporting the knife 15. The cutter bar 11 may be supported from the forward edge of a frame 17 if the cutter bar is to be used on a forage harvester.

The drive mechanism 19 preferably is located at an end of the cutter bar assembly 10 for reciprocating the knife 15. The drive mechanism 19 comprises a drive body 20 which may be mounted on an end 21 of the cutter bar. The body 20 has a bearing portion 22 for rotatably supporting a shaft 24 terminating at its forward end in a crank 25 which may be combined with a flywheel. As indicated in Figure 3, the shaft 24 may extend forwardly downwardly in a direction perpendicular to the length of the cutter bar assembly 10 making an angle of about 7° with the horizontal. Preferably, a universal joint 26 is provided on the shaft 24 a short distance behind the bearing portion 22. For convenience of description, the parts of the drive mechanism will be referred to as if the drive linkage to be described operated in a true vertical plane passing through the knife 15 rather than being inclined at an angle of about 7°.

A rigid arm 27, comprising a part of the drive body 20 extends upwardly from the bearing portion 22 of the body and supports a pivot 29 extending parallel to the shaft 24 and located above and to one side of the shaft and crank 25. A rigid, straight link 30 has its upper end 33 pivotally supported on the pivot 29 for oscillating motion, the link 30 having a pivot 31 adjacent its lower end 38 and parallel to the pivot 29 and shaft 24, the length of the link between the pivots 29 and 31 being slightly longer than the vertical distance between the shaft and the upper pivot, as will be explained.

The crank 25 and pivot 31 at the lower end 38 of the link 30 are linked by one arm 32 of a bell crank lever 34, the length of said one arm preferably being equal to the horizontal distance or offset of the pivot 29 from the shaft 24. Accordingly, as the shaft 24 is rotated, the well crank lever 34 oscillates the link 30 through an arc bisected by a perpendicular from the pivot 29 (see Figure 4). In order to maintain balanced loads on the bearings, the bell crank lever 34 may be formed of two spaced parallel plates fitting one on each side of the lower end of link 30.

The other arm 35 of the bell crank lever 34 projects downwardly from the pivot 29 at substantially a right angle and carries a pivot 36 adjacent its lower end. The pivot 36 is so located as to be at the intersection of the lines of instantaneous centers established by pivots 29 and 31 of the link 30 and by the shaft 24 and crank 25 at the extreme ends of the path of movement of the lower end of arm 35. The angular position of the crank 25 at the extreme ends of the stroke of the lower end of arm 35 of the bell crank lever 34 does not coincide with the positions of the crank when the link 30 is at the ends of its stroke (see Figure 4). Preferably, the length of the link 30 is very slightly longer than the vertical distance between the shaft 24 and the upper pivot 29 so that when the lower end of the arm 35 of the bell crank lever is at either end of its travel, the lower pivot 31 will be at the same elevation as the shaft 24.

The path generated by the pivot 36 is essentially straight, producing an essentially horizontal rectilinear movement parallel to a plane passed through the lower pivot 31 of the link 30 when pivot 36 is at the ends of its travel (Figure 4). The precise path of movement of this pivot will vary slightly depending on the specific proportions of the various elements of the drive mechanism, but can be held down to 0.010 of an inch maximum vertical movement with a crank arm of about one inch and a length of link 30 of a little less than 7 inches, producing a rectilinear knife stroke of about 2½ inches.

Inasmuch as the vertical movement of the pivot 36 is in the nature of about 0.010 of an inch, this pivot can be connected to the adjacent end of the knife 15 by a rigid link 37 clamped about the ends of the knife by a bolt 39, the mounting of the knife on the cutter bar 11 providing clearance such as to permit this slight amount of vertical movement by the knife. Accordingly, a simple, light weight knife head may be used and there is no necessity of providing guides adjacent the knife head to prevent vertical movement thereof.

In the above described drive mechanism, the second arm 35 of the bell crank lever is generally vertical at both extremes of movement of the link 30, and the arm 35 is at approximately maximum angular position at the time that the link 30 is at perpendicular. Thus, the oscillatory movement of the bell crank lever compensates for the arc of the link 30 to provide essentially a straight line movement. In addition, the oscillatory movement of the bell crank lever 34 amplifies the horizontal component of the movement of pivot 31 at the lower end 38 of the link 30, thus permitting a sufficiently long mower stroke (about 2½ inches) with relative slight oscillation of the link 30. Accordingly, velocity and mass of the moving parts is reduced with an attendant reduction in vibration and decreased wear of the parts.

While the entire cutter bar assembly including the drive is tilted forward at an angle of about 7°, the positioning of the assembly is a matter of choice which has no relation to the drive of the present invention. The cutter bar assembly may be level, may be tilted more or less than here described, or may be inclined without affecting the cutter bar drive here described.

We claim:

1. A drive mechanism for a cutter bar assembly having a cutter bar and a knife, said mechanism comprising: a body mounted adjacent an end of the cutter bar, a crank journaled in the body for rotation about a fixed, substantially horizontal axis extending at right angles to the cutter bar, a link having its upper end mounted on a fixed pivot supported by the body and located above and offset to one side of the axis of the crank, a bell crank lever having one leg extending generally horizontally between the crank and the lower end of the link and the other leg extending downwardly generally in prolongation of the link, and a knife head rigidly connected to the end of the knife and pivotally connected to the lower end of said other leg, said pivotal connection being located at the intersection of the lines of instantaneous centers of the link pivot and pivot connecting the link and bell crank and the crank shaft axis and crank axis at the extreme ends of the path of movement of the lower end of the bell crank lever, rotation of the crank producing oscillation of the link and substantially straight line reciprocatory motion of the lower end of said other leg of the bell crank lever.

2. A drive mechanism for a cutter bar assembly having a cutter bar and a knife, said mechanism comprising: a body mounted adjacent an end of the cutter bar, a crank journaled in the body for rotation about a fixed, substantially horizontal axis extending at right angles to the cutter bar, a link having its upper end mounted on a fixed pivot supported by the body and located above and offset to one side of the axis of the crank, a bell crank lever having one leg extending generally horizontally between the crank and the lower end of the link and the other leg extending downwardly generally in prolongation of the link, and means drivingly connecting the knife with the lower end of said other leg, the connection being located at the intersection of the lines of instantaneous centers of the link pivot and pivot connecting the link and bell crank and the crank shaft axis and crank axis at the extreme ends of the path of movement of the lower end of the bell crank lever, rotation of the crank producing oscillation of the link and substantially straight line reciprocatory motion of the lower end of said other leg of the bell crank lever.

References Cited in the file of this patent

UNITED STATES PATENTS

| 142,111 | Kirby | Aug. 26, 1873 |
| 968,046 | Griggs et al. | Aug. 23, 1910 |
| 2,548,296 | Femons | Apr. 10, 1951 |
| 2,692,508 | Orr | Oct. 26, 1954 |
| 2,736,156 | Hardman | Feb. 28, 1956 |
| 2,819,618 | Slusher | Jan. 14, 1958 |

FOREIGN PATENTS

| 350,123 | Germany | Mar. 14, 1922 |